United States Patent [19]

Gutknecht

[11] Patent Number: 4,932,313
[45] Date of Patent: Jun. 12, 1990

[54] AIR BEARING PISTON AND CYLINDER ASSEMBLY

[76] Inventor: William H. Gutknecht, 2301 Milky Way Dr., Pulaski, Tenn. 38478

[21] Appl. No.: 251,904

[22] Filed: Sep. 30, 1988

[51] Int. Cl.⁵ .................................................. F16J 1/08
[52] U.S. Cl. ................................... 92/181 R; 92/160; 92/DIG. 2; 384/12; 384/115
[58] Field of Search .................. 92/127, 141, 158–160, 92/181 P, 181 R, 182, 184, DIG. 1, DIG. 2; 384/12, 115, 391

[56] References Cited

U.S. PATENT DOCUMENTS

| | | | |
|---|---|---|---|
| 3,035,879 | 5/1962 | Hanny et al. | 92/181 R X |
| 3,319,534 | 5/1967 | Boonshaft | 92/184 X |
| 3,631,766 | 1/1972 | Kraakman | 92/181 R X |
| 4,207,807 | 6/1980 | Takata et al. | 92/159 X |
| 4,644,851 | 2/1987 | Young | 92/127 |

FOREIGN PATENT DOCUMENTS

| | | | |
|---|---|---|---|
| 2615994 | 10/1976 | Fed. Rep. of Germany | 92/160 |
| 394740 | 12/1965 | Switzerland | 92/160 |

*Primary Examiner*—Carl D. Price
*Assistant Examiner*—George Kapsalas
*Attorney, Agent, or Firm*—Joseph H. Beumer

[57] ABSTRACT

A piston for a gas-operated linear actuator wherein a double-acting piston moves axially within a cylinder in response to gas pressure applied intermittently to chambers on either side of the piston. The piston has reservoirs in the form of holes in each of its faces and a pair of spaced-apart circumferential grooves, one communicating with the holes in one piston face and the other with the holes in the other piston face, the two sets of grooves and holes being kept out of communcation with one another. Gas under pressure introduced into one chamber forces the piston to move toward the opposite chamber, and a portion of the gas passes into the holes and out through the adjacent groove, providing a stream of gas between piston and cylinder walls, producing a gas-bearing effect. Upon completion of a piston stroke in one direction by this means, pressurized gas is introduced into the opposite chamber, moving the piston in the opposite direction and providing a flow of a portion of the gas through the other set of holes and grooves, again providing a gas-bearing effect between piston and cylinder walls. This structure avoids any requirement for placement of rings around the piston wall.

12 Claims, 2 Drawing Sheets

AIR BEARING PISTON AND CYLINDER ASSEMBLY

BACKGROUND OF THE INVENTION

1. Field of the Invention

This invention relates generally to pistons and cylinders and more particularly to double-acting pistons for pneumatic actuators.

2. Description of the Prior Art

Piston and cylinder assemblies for various applications such as engines, compressors, pumps, and linear actuators typically have rings disposed in circumferential grooves in the piston wall for purposes of providing a seal between the piston and cylinder wall or for facilitating lubrication and keeping the piston from scraping the cylinder wall. In the case of pistons for double-acting pneumatic actuators, which provide reciprocating linear movement in response to pressurized gas alternately applied to chambers in the cylinder facing opposite ends of the piston, the piston conventionally has been provided with a pair of spaced-apart circumferential grooves and an O-ring of plastic or elastomeric material disposed in each groove. The O-ring in such devices keeps the piston out of contact with the cylinder wall, prevents loss of pressure around the piston, and may comprise a material impregnated with a lubricant to reduce friction.

While use of O-rings in piston grooves has proven effective for double-acting pneumatic actuators, certain disadvantages are presented. O-rings in this application eventually wear out, limiting the operating life of the actuator. In addition, even when the O-rings are lubricated, friction between the rings and cylinder wall, which must be overcome on each stroke, results in a time lag between strokes. Such a lag becomes significant where the actuator is sought to be precisely controlled, as by a computerized system. The presence of rings also increase the minimum operating gas pressure for a particular actuation system.

Provision of a gas-bearing effect between a piston and cylinder walls for certain types of applications is disclosed in the prior art. U.S. Pat. No. 4,644,851 discloses a piston for a linear compressor that has a reservoir inside the piston along with apertures that communicate with gas pockets on the piston wall, thus forming a gas bearing between the piston and cylinder wall. The piston structure shown in this patent is complex, including axial channels on the piston wall surface as well as spaced-apart gas pockets and a recess surrounding the channels and gas pockets. The piston disclosed in this patent is a single-acting piston for compressing refrigeration gases, and its complex structure does not lend itself to economical fabrication for use in linear actuators. Also, no suggestion is made regarding use of such structure for a double-acting piston. U.S. Pat. No. 4,681,326 also discloses a piston that obtains a gas bearing effect by trapping combustion gases between piston rings. This structure, of course, still requires the presence of rings, and the piston is a single-acting piston for an internal combustion engine. Another piston that provides a gas bearing is shown in USSR Author's Certificate No. 454,805. This piston, for a gas compressor, has an internal chamber that communicates with the high-pressure region facing the piston head and with outwardly movable segments disposed in a circumferential groove. Radially extending apertures are also provided for delivery of gas to the space between the piston and cylinder walls. A gas compressor piston having a gas bearing produced by introducing gas into the space between piston and cylinder through holes in the cylinder wall is shown in USSR Author's Certificate No. 883,549, and a similar structure is disclosed in USSR Author's Certificate No. 703,708. The latter two devices require specially fabricated cylinders and other features that would not be feasible for application to double-acting linear actuators. While the above-discussed patents disclose various approaches to achieving a gas-bearing effect between a piston and a cylinder, none of those approaches would be amenable to practical application for linear actuators.

SUMMARY OF THE INVENTION

The present invention is directed to a double-acting piston for a gas-operated linear actuator that provides a gas-bearing effect between the piston wall and the wall of the cylinder in which the piston operates. This result is achieved by means of a pair of axially spaced-apart circumferential grooves in the piston wall, one of the grooves communicating with an aperture in one head of the piston and the other communicating with an aperture in the opposite head, the two sets of grooves and apertures being separated from one another by an internal barrier in the piston. Upon introduction of compressed gas into the chamber between one head of the piston and the adjacent end cap, a portion of the gas passes through the aperture in the head and outward through the circumferential groove with which the aperture communicates, providing a gas bearing and keeping the piston separated from the cylinder wall. The same action occurs in the reverse stroke when gas is introduced into the chamber between the opposite piston head and end cap, a portion of the gas passing through the piston aperture at that end and radially outward through the circumferential groove with which the aperture communicates. This piston structure avoids any need for rings or other components between the piston and cylinder walls, while allowing use of the same type of cylinders as are employed for linear actuators having O-ring disposed around the piston. No lubrication is required, and the disadvantages associated with O-rings are overcome. Operating lifetime is increased since there are no O-rings to wear out. Any time lag resulting from overcoming O-ring friction is avoided, enabling more precise control of actuator operation by computerized equipment. Furthermore, elimination of O-rings allows operation of a linear actuator at a lower gas pressure.

It is, therefore, an object of this invention to provide a gas-operated piston that produces a gas-bearing effect between the walls of the piston and of the cylinder in which it is located.

Another object is to provide a double-acting piston for a pneumatic actuator that may operated without use of any rings on the piston.

Another object is to provide such a piston that may operate without a lubricant.

Another object is to provide a double-acting piston and cylinder assembly that includes means in the piston for keeping the piston and cylinder walls separated from one another in operation.

Other objects and advantages of the invention will be apparent from the following detailed description and claims appended hereto.

DESCRIPTION OF THE PREFERRED EMBODIMENT

Figure 1:
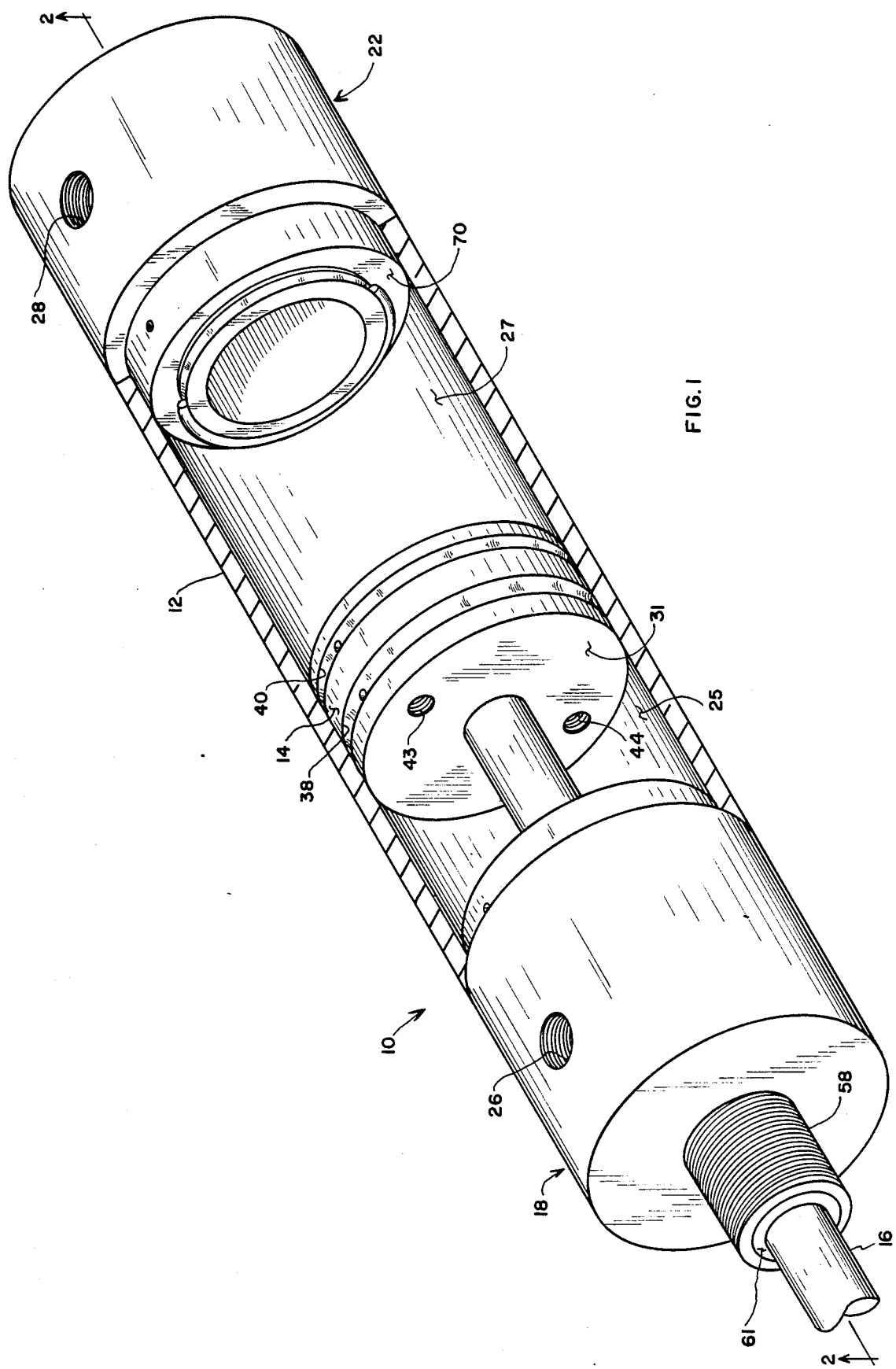
FIG. 1 is a pictorial view, partly broken away, of a pneumatic actuator including a double-acting piston and cylinder assembly embodying the invention.
Figure 2:
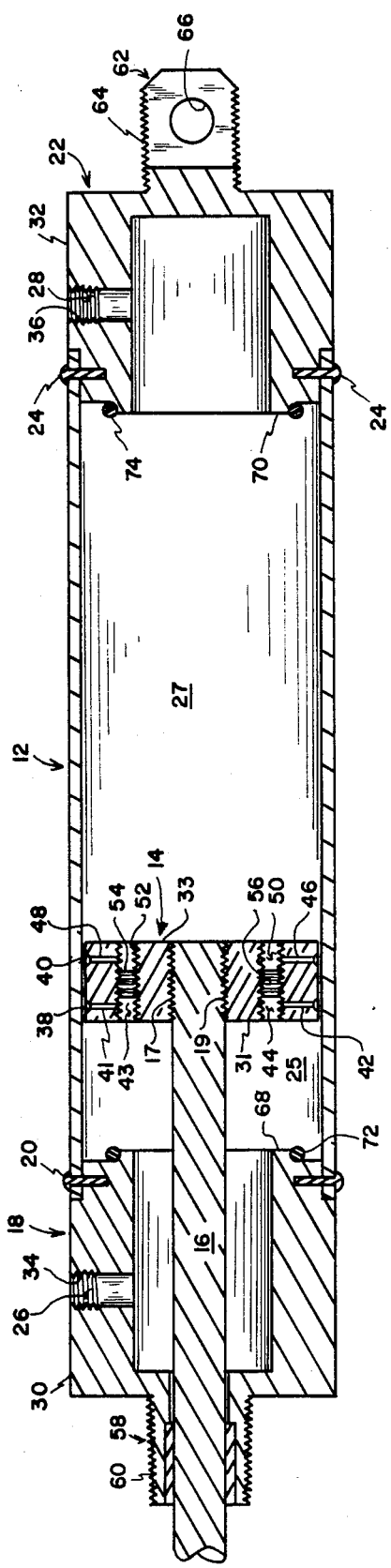
FIG. 2 is a sectional view taken along line 2—2 of FIG. 1.

Referring to FIG. 1 of the drawings, there is shown a pneumatic actuator 10 having a cylinder 12 in which a piston 14 is disposed for reciprocating axial movement. The piston has secured thereto an axially extending shaft 16 which is connectable at its outside end by means not shown to equipment requiring reciprocal linear actuation. The shaft is connected to the piston by means of its threaded end portion 17 (FIG. 2) being screwed into threaded hole 19 at the axis of the piston. The cylinder at the end through which the shaft extends has a front cap 18 fitted over the end of the cylinder wall and secured to the wall by rivets 20, and at its opposite end a rear cap 22 similarly fitted and secured by rivets 24. Caps 18 and 22 have apertures 26 and 28, respectively, radially penetrating their side walls 30 and 32 and communicating the interior of the cylinder at each end with the outside of the cylinder. Threads 34 and 36 are provided on the inside of the apertures for connection with air lines (not shown) for supplying compressed air to chambers 25 and 27 defined by front face 31 and rear face 33, respectively, of the piston and by the cylinder wall and end caps 18 and 22.

Piston 14 has a pair of axially spaced apart grooves 38 and 40 of generally semi-circular cross section disposed circumferentially in the piston wall. Groove 38 communicates with chamber 25 through radial passageways 41 and 42 and axially disposed apertures 43 and 44 that extend to front face 31. Similarly, groove 40 communicates with chamber 27 through radial passageways 46 and 48 and axial apertures 50 and 52 that extend to rear face 33. The two sets of grooves, apertures and passageways, are kept out of communication with one another by means of barriers 54 and 56. By means of this construction, a portion of compressed air from whichever of chambers 25 or 27 is at higher pressure will be forced outward through the groove nearest that chamber and into the space between the piston and cylinder wall, creating an air bearing and preventing the cylinder from touching the cylinder wall. Upon completion of a stroke, compressed air introduced into the chamber at the opposite end of the cylinder will then be forced out through the other groove. Thus, an air bearing is produced for movement of the piston in both directions.

Front cap 18 has an axially extending tubular projection 58 provided with external threads 60 for attachment to support means (not shown). A bushing 61 is disposed concentrically within the projection at its outer end to support shaft 16 for rotation therein. Rear cap 22 also has an axially extending projection 62 with external threads 60 for attachment to support means (not shown). The projection in the embodiment shown also has a radially extending hole 66 which may be conveniently used for attachment to certain types of supporting equipment.

End caps 18 and 22 may include in their inside faces 68 and 70, which oppose faces 31 and 33 of the piston, annular bumpers 72 and 74, preferably made of elastomeric material, such as rubber. The bumpers prevent the piston from slapping against metal surfaces of the end caps and reduce any noise and shock which would result therefrom. The bumpers may alternately be installed on both faces of the piston instead of on the end caps.

The specific piston structure illustrated for the above-described embodiment is amenable to convenient and cost-effective fabrication. Axially extending apertures 43 and 44 and 50 and 52 may be provided by drilling two holes axially, entirely through the piston and subsequently inserting plugs at the middle of each hole to separate each hole into two apertures, one in each face of the piston. This procedure allows the piston to be easily supported through the length of the unplugged holes by means of jig fixtures for machining of the circumferential grooves. Plugs may be provided by threading the inside of the holes and screwing a threaded locking plug down to the middle of the piston as shown. Radial passageways 41, 42, 46, and 48 may be readily provided by drilling.

The described embodiment has two axial apertures and two radial passageways spaced 180° apart on the piston for transmission of gas to each groove. This number of apertures and passageways is not critical to the invention and more may be employed, especially for larger pistons.

The invention is not limited to particular sizes for the grooves, apertures, and passageways except that they must be large enough to transmit gas from the chamber at higher pressure to the space between piston and cylinder walls at a higher pressure than exists at lower pressure chamber in each stroke. The semi-circular shape shown for the circumferential also is not critical, and other shapes as exemplified by triangular or rectangular cross sections may also be used.

With regard to materials of construction, conventional materials such as aluminum, stainless steel, or brass may be used. Cylinder and piston walls may be subjected to various conventional surface treatments such as anodizing, Teflon ® anodizing, chemical conversion, or incorporating a dry film lubricant by means of a surface treatment. The bushing may be made of bronze, brass, or the like, preferably impregnated with a lubricant to prevent shaft wear.

Actuators embodying the invention may be operated over a wide range of gas pressures, for example, from about 2 psi to 200 psi. For the embodiment shown, the minimum operating air pressure is about 2 psi, which pressure is about one-half that required for similar actuators using O-rings on the piston.

Prolonged testing of actuators embodying the invention, for periods up to 1,480 hours, has demonstrated no significant wear of the piston and cylinder walls, indicating a substantially longer obtainable operating lifetime than for comparable o-ring contain actuators.

Single-acting pistons may also be provided with gas-bearing capability by employing only one circumferential groove and one set of apertures and passageways communicating the groove with the piston face. For such application, the cylinder assembly would be provided with a spring or other means for returning the piston to its original position after each stroke. The gas-transmitting features of the invention may also be used for transmitting liquids in certain types of hydraulic actuators.

While the invention has been described above with reference to a preferred embodiment thereof, it will be understood by those skilled in the art that various changes in form and detail may be made without departing from the spirit and scope of the invention as defined in the appended claims.

I claim:

1. A gas-lubricated linear actuator assembly comprising a cylinder, end caps substantially enclosing each end thereof, a piston having a circular side wall and two end faces and being adapted for reciprocal axial movement in the cylinder, the piston and cylinder walls being spaced apart slightly from one another, means for intermittently introducing pressurized gas into regions within first one and the other ends of said cylinder, a shaft secured to said piston and extending outward axially through one of said end caps, bushing means disposed in said one end cap for supporting said shaft in closely fitting relation thereto, first aperture means in one of said piston faces communicating with one of said chambers, second aperture means in the other of said piston faces communicating with the other of said chambers, barrier means separating said first and second aperture means from one another, first passageway means communicating said first aperture means with the space between the piston and cylinder walls, and second passageway means axially spaced apart from said first passageway means and communicating said second aperture means with the space between piston and cylinder walls, said piston wall having a smooth surface except for said passageway means;

whereby, upon application of gas pressure intermittently into first one and then the other of said chambers, a portion of the gas so applied will be projected into the space between piston and chamber walls, forming a gas bearing therebetween during each stroke of the piston.

2. An actuator as defined in claim 1 wherein each of said passageway means includes a circumferential groove in said piston.

3. An actuator as defined in claim 2 wherein said first and second aperture means comprise a plurality of generally cylindrical holes defined in said piston extending axially inward from a piston face.

4. An actuator as defined in claim 3 wherein said passageway means includes, for each said hole, a radially disposed channel defined in said piston and communicating each said hole with the circumferential groove nearest thereto.

5. An actuator as defined in claim 4 wherein each of the cylindrical holes comprising the first aperture means is in axial alignment with one of the holes comprising the second aperture means and the barrier means comprising a plug.

6. An actuator as defined in claim 5 wherein said circumferential grooves have a generally semi-circular cross section.

7. In a linear actuator assembly comprising a cylinder, a double-acting piston adapted to move axially and reciprocally within said cylinder, said piston having two end faces and a circular side wall and being of a size that its wall is slightly spaced apart from the wall of said cylinder, said assembly including end caps enclosing each end thereof and defining a pressure chamber between each face of the piston and the end cap nearest thereto, means for alternately introducing pressurized gas into first one and then the other of said chambers, a shaft secured to said piston and adapted to be axially and reciprocally moved by said piston and bushing means, supporting said shaft in one of said end caps to provide for axial movement of the shaft therethrough and to guide the shaft so as not to allow lateral movement thereof, the improvement comprising:

first aperture means in one of said piston faces communicating with one of said chambers;

second aperture means in the other of said piston faces communicating with the other of said chambers;

barrier means separating said first and second aperture means from one another;

first passageway means communicating said first aperture means with the space between the piston and cylinder walls;

second passageway means axially spaced apart from said first passageway means and communicating said second aperture means with the space between piston and cylinder walls; and said piston wall having a smooth surface except for said passageway means;

whereby, upon application of gas pressure intermittently into first one and then the other of said chambers, a portion of the gas so applied will be projected into the space between piston and chamber walls, forming a gas bearing therebetween during each stroke of the piston.

8. The improvement as defined in claim 7 wherein each of said passageway means includes a circumferential groove in the wall of said piston.

9. The improvement as defined in claim 8 wherein said first and second aperture means each comprises a plurality of axially extending holes defined in a face of the piston.

10. The improvement as defined in claim 9 wherein each of said passageway means comprises radially disposed channels connecting each of said holes to the groove nearest thereto.

11. The improvement as defined in claim 10 including bumper means disposed in each of said end caps in opposing relation to each of the faces of said piston.

12. The improvement as defined in claim 11 wherein said bumper means comprises an annular member of elastomeric material.

* * * * *